April 15, 1969     G. LE ROY     3,438,540
SIGHT GLASS FOR REACTION VESSELS
Filed Oct. 22, 1965
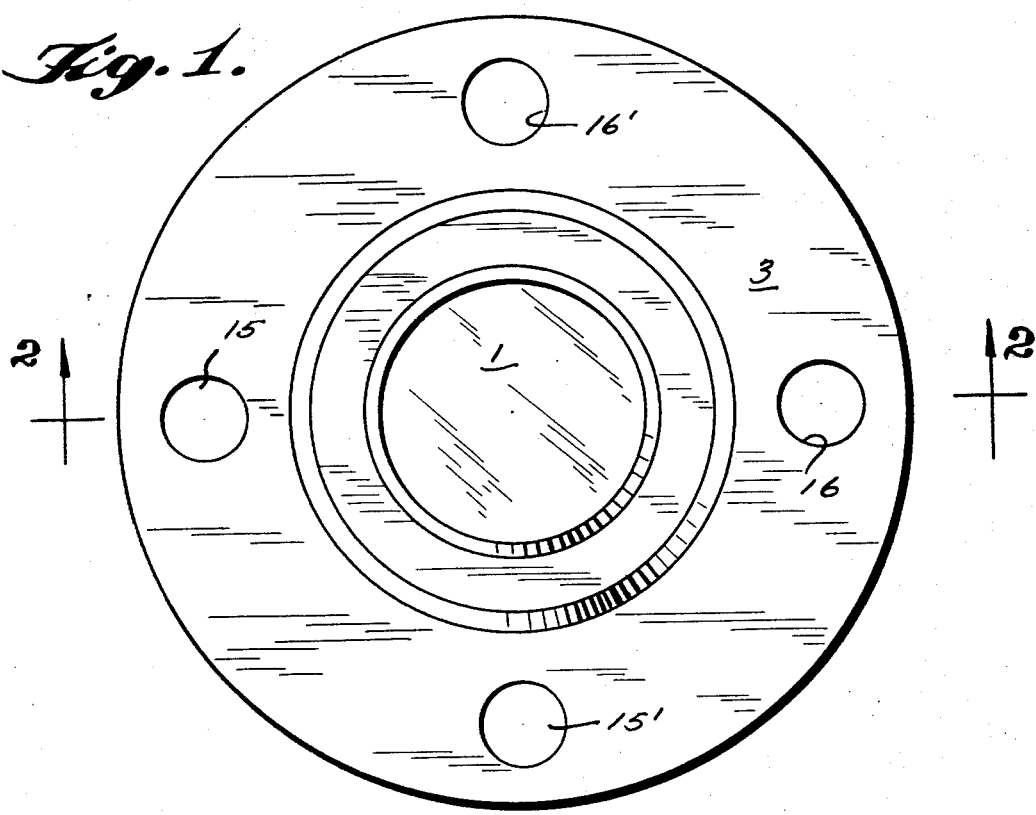
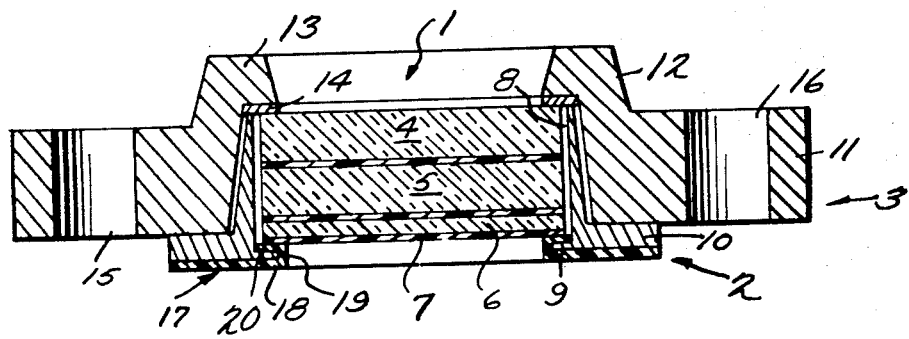
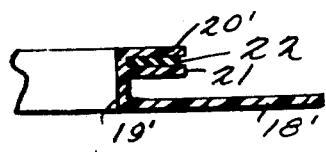
INVENTOR
GENE LE ROY
BY Cushman, Darby & Cushman
ATTORNEYS United States Patent Office 3,438,540
Patented Apr. 15, 1969

3,438,540
SIGHT GLASS FOR REACTION VESSELS
Gene Le Roy, Rte. 1, Box 510, Maplewood Estates,
Scott Depot, W. Va. 25560
Filed Oct. 22, 1965, Ser. No. 502,661
Int. Cl. B65d 53/00
U.S. Cl. 220—46                    8 Claims

ABSTRACT OF THE DISCLOSURE

A J-shaped gasket for protecting a sight glass secured over an opening in a vessel where a resilient cushion member may be inserted in one of the legs of the gasket for absorbing pressure between the sight glass and the vessel.

The present invention relates to a sight glass for use with enclosed vessels and the like. More particularly, it is an improvement on the sight glass of U.S. Patent 3,148,543 which provides for improved corrosion resistance and better hermetic sealing.

A sight glass is a device secured over an opening in a vessel to permit inspection of the contents. Similar devices also are used as windows for ships which are submerged in water. Generally the glass comprises a lens and associated parts which hold it against the rim around the opening.

The lens frequently is a laminate comprising one or more layers of tempered glass, selected for high strength, and a layer of untempered glass such as borosilicate which is resistant to attack by corrosive elements. Two layers of tempered glass are preferred because tempered glass, which is under stress, has a tendency to rupture. That is, the chances of damage from rupturing of a tempered glass lens are reduced by using two layers because it is highly unlikely that both lenses will rupture at the same time.

In the aforesaid U.S. patent, a particularly useful mounting for laminated lenses is disclosed and claimed. It comprises an annular lens holding sleeve or ferrule and a compression ring which holds the ferrule against the wall of the vessel. The ferrule is a tube having an inwardly projecting lip or ledge at its inner end and the lens assembly fits within the tube and against the ledge. Ordinarily a gasket is used between the ledge and the lens. The inner end of the ferrule is arranged to fit against the rim of the opening of the vessel and a gasket is provided between them to assure a tight, strain-free seal.

A portion of the ledge is exposed to the interior of the vessel, that is the portion between the surface against which the lens rests and the portion which is pressed against the vessel. Therefore, this portion of the ferrule is subject to attack by the materials within the vessel. When those materials are especially corrosive, the ferrule must be made corrosion resistant. For example, it may be constructed of a corrosion resistant grade of stainless steel. The exposed surface may be covered with a glass material similar to the glass lining used in chemical reactors. Either procedure is expensive and relatively undesirable.

Therefore, one object of the present invention is to provide a gasket which protects against corrosive attack on a lens ferrule having an inwardly extending ledge.

Another object of the invention is to deal with certain problems associated with the gaskets used in the lens ferrule. That is, the gasket between the lens and the above-described ledge is sealed to the lens by means of an adhesive which prevents escape of gaseous materials. It has been found in practice that there is a risk of breaking this seal. In accordance with a preferred form of the present invention, this difficulty is avoided.

In order to fully disclose the gasket which achieves the foregoing and other objects, there will now be described a preferred form, reference being made to the drawing in which:

FIGURE 1 is a plan view of a sight glass;
FIGURE 2 is a cross-section along lines 2—2 of FIGURE 1; and
FIGURE 3 is a cross-section of a preferred form of gasket.

As shown in FIGURES 1 and 2, the sight glass comprises three principal elements: a lens assembly 1, a ferrule 2 and a compression ring 3. The lens assembly is a laminate of these glass elements, including two layers of tempered glass 4 and 5 and a layer of corrosion resistant glass such as borosilicate glass 6 selected for corrosion resistance. The layers are cemented together by a resinous material such as epoxy resin and may be enclosed in a metal tube to prevent access of corrosive materials to the resinous materials.

In the form of the invention illustrated, the innermost layer of glass is borosilicate and a thin layer of corrosion resistant plastic 7 is provided over it. This may be a plastic film bonded to the borosilicate glass, such as Kel-F, a high molecular weight polymer of chlorotrifluoroethylene or fluorinated ethylene-propylene resin. These polymers also may be obtained in the form of an aqueous dispersion which conveniently is sprayed on.

The ferrule 2, in the form shown, is a frustum having a cylindrical inner bore 8 to receive the lens assembly and internal and external flanges 9 and 10 at its inner end. The internal flange 9 provides a ledge against which the lens assembly rests and the external flange 10 is a stop for the compression ring 3.

As shown especially in FIGURE 2, the compression ring 3 has a circular plate 11 which rests on the external flange 10, a frustoconical portion 12 which surrounds the ferrule, and an upper annular section 13 extending inwardly from the portion 12 and overlying the lens assembly 1. There is a space between the section 13 and the top of the ferrule which receives a gasket 14. That is, the distance from the bottom of this annular section to the bottom of the compression ring is greater than the distance from the top of the ferrule to the top of external flange 10. Consequently, when the compression ring is tight and down against flange 10, there is a controlled distance between the top of ferrule and annular section 13, and regulated pressure is applied to the gasket 14. Four bolt holes 15, 15', 16 and 16' are provided on plate 11 for fastening the compression ring 3 to the vessel and tightening it against flange 10.

One form of the novel gasket of the present invention is indicated by the numeral 17 in FIGURE 2. It is ring-shaped and comprises three integral annular sections indicated by 18, 19 and 20. Section 18 is preferably flat and of the same dimensions as the bottom of the ferrule. Section 19 is approximately perpendicular to section 18 and extends upwardly from its inner edge. It will be appreciated that the diameter of the section 19 is less than the diameter of the inner edge of flange 9 and, in the form shown, is as wide as the height of flange 9. The third section, 20 is approximately parallel to section 18 and extends outwardly from section 19 and between flange 9 and the lens assembly 1.

Another form of the gasket is shown in FIGURE 3. It also comprises three annular sections 18', 19' and 20' similar to the sections 18, 19 and 20 described above. In addition, there is an annular section 21 generally parallel to section 20' but between it and section 18', providing a U-shaped cross-section of which sections 20' and 21 are the legs and the upper part of section 19' is the base. The distance between sections 18' and 21 is at least equal to and preferably is the same as the thickness of flange 9. The section 19' is correspondingly wider than the thickness of flange 9. Thus, there are two layers of gasket material between the lens assembly 1 and the flange or ledge 9.

This form of the invention is particularly desirable because it reduces the possibility of leakage between the gasket and the lens assembly. In use, section 20 of the gasket is sealed to the lens with an adhesive but there is a tendency for the seal formed by the adhesive to be broken by shearing forces. These forces are partially absorbed by the gasket material, but the capacity of the gasket to protect the seal against shearing forces is limited by the shear modulus which is relatively high for preferred gasket materials. For example, Teflon (polytetrafluoroethylene) and Kel-F (polychlorotrifluoroethylene) are useful. The gasket shown in FIGURE 3 avoids this problem because the stresses are absorbed by bending of section 19 and sliding of sections 20' and 21 against each other. That is, it is capable of easier response to shearing stresses.

It is preferred that, in using the gasket of FIGURE 3, a resilient cushion member 22 be inserted in the space between sections 20' and 21, i.e. between the legs of U-shaped cross-section mentioned above. This may be an elastomeric material such as neoprene, for example in the form of an O-ring. It is less important that this material be resistant to chemical attack, since it ordinarily is not exposed to the materials within the vessels.

It is also possible to employ a cushion-type material between section 18 and the bottom of the ferrule 2. Materials suitable for this purpose are available commercially. In this case, the length of section 19 would be increased.

In use, it is preferred to seal the lens assembly into the ferrule and against section 20 of the gasket. The unit is then supplied with gasket 14, placed under compression ring 3 and bolted to a vessel. Thus a further advantage is obtained in that it is not necessary to position a gasket between ferrule 2 and the vessel, the gasket being aligned automatically by being an integral part of the gasket 17 which is already held on the ferrule.

It will be appreciated that while various specific embodiments have been disclosed no limitation to them is intended, and modifications and improvements may be made without departing from the scope of the invention.

What is claimed is:

1. In a sight glass for cooperation with an opening in a vessel which comprises a lens, a ferrule having an internal opening receiving said lens and an inwardly extending annular ledge adjacent its inner end against which said lens is held, and means for compressing said ferrule against the vessel;

an improved gasket comprising a first section between said lens and said ledge, a second section underlying the inner end of said ferrule and positioned between the ferrule and the vessel, a third section within said annular ledge and connecting said first and second sections, whereby said ferrule is protected from attack by corrosive materials within said vessel a fourth section between said first section and said ledge to minimize shearing strain between said first section and said lens and a resilient cushion between the first and fourth sections of said gasket to absorb pressure between said lens and said ledge.

2. The sight glass of claim 1 wherein the first section of said gasket is cemented to said lens.

3. The sight glass of claim 1 in which said gasket is polytetrafluoroethylene.

4. In a ferrule-lens assembly for a sight glass adapted for cooperation with an opening in a vessel and to be held against said vessel comprising a lens, a ferrule having an internal opening receiving said lens and an inwardly extending annular ledge adjacent its inner end against which said lens is held;

an improved gasket comprising a first section between said lens and said ledge, a second section underlying the inner end of said ferrule and positioned between the ferrule and the vessel, a third section within said annular ledge and connecting said first and second sections, whereby said ferrule is protected from attack by corrosive materials within said vessel, a fourth section between said first section and said ledge to minimize shearing strain between said first section and said lens and a resilient cushion between the first and fourth sections of said gasket to absorb pressure between said lens and said ledge.

5. The ferrule-lens assembly of claim 4 wherein the first section of said gasket is cemented to said lens.

6. The ferrule-lens assembly of claim 4 in which said gasket is polytetrafluoroethylene.

7. In a sight glass for cooperation with an opening in a vessel which comprises a lens, a ferrule having an internal opening receiving said lens and an inwardly extending annular ledge adjacent its inner end against which said lens is held, and means for compressing said ferrule against the vessel;

an improved gasket having a U-shaped cross-section and comprising a first section which is one leg of the U-shaped cross-section, between said lens and said ledge, and which is cemented to said lens, a second section which is the other leg of the U-shaped cross-section, between said first section and said ledge, a third section connecting said first and second sections which can flex and absorb shearing stress between said ledge and said lens and a resilient member between the legs of said U-shaped cross-section to absorb pressure between said lens and said ledge.

8. In a ferrule-lens assembly for a sight glass adapted for cooperation with an opening in a vessel and to be held against said vessel comprising a lens, a ferrule having an internal opening receiving said lens and an inwardly extending annular ledge adjacent its inner end against which said lens is held;

an improved gasket having a U-shaped cross-section and comprising a first section which is one leg of said U-shaped cross-section, between said lens and said ledge, and which is cemented to said lens, a second section which is the other leg of said U-shaped cross-section, between said first section and said ledge, a third section within said annular ledge and connecting said first and second sections which can flex and absorb shearing stress between said ledge and said lens and a resilient member between the legs of said U-shaped cross-section to absorb pressure between said lens and said ledge.

References Cited

UNITED STATES PATENTS

| 2,215,537 | 9/1940 | Bjong | 220—82 |
| 2,672,757 | 3/1954 | Johnson | 73—330 |
| 2,970,718 | 2/1961 | Jennings | 220—46 X |
| 3,088,811 | 5/1963 | Jones | 116—117 X |
| 3,148,543 | 9/1964 | LeRoy | 73—331 |
| 3,205,351 | 9/1965 | Walker | 350—252 X |
| 3,307,400 | 3/1967 | LeRoy | 73—331 |
| 2,122,399 | 7/1938 | Abbe | 220—46 X |
| 2,789,847 | 4/1957 | Jackson. | |
| 2,726,006 | 12/1955 | Brewer et al. | 220—46 X |

LOUIS R. PRINCE, Primary Examiner.

DANIEL M. YASICH, Assistant Examiner.

U.S. Cl. X.R.

220—82; 73—334